US009067842B2

(12) United States Patent
Neff et al.

(10) Patent No.: US 9,067,842 B2
(45) Date of Patent: Jun. 30, 2015

(54) ENCAPSULATED PARTICLE

(71) Applicant: BASF SE, Ludwigshafen (DE)

(72) Inventors: Raymond Neff, Northville, MI (US); Alexander Gershanovich, Beverly Hills, MI (US); Donald C. Mente, Grosse Ile, MI (US)

(73) Assignee: BASF SE, Ludwigshafen (DK)

( * ) Notice: Subject to any disclaimer, the term of this patent is extended or adjusted under 35 U.S.C. 154(b) by 116 days.

(21) Appl. No.: 13/896,975

(22) Filed: May 17, 2013

(65) Prior Publication Data
US 2013/0309499 A1 Nov. 21, 2013

Related U.S. Application Data

(60) Provisional application No. 61/648,707, filed on May 18, 2012, provisional application No. 61/648,766, filed on May 18, 2012, provisional application No. 61/648,884, filed on May 18, 2012.

(51) Int. Cl.
C09D 175/08 (2006.01)
B32B 27/40 (2006.01)
C05G 3/00 (2006.01)
B01J 13/14 (2006.01)
B01J 13/22 (2006.01)

(52) U.S. Cl.
CPC ......... C05G 3/0088 (2013.01); Y10T 428/2998 (2015.01); B32B 27/40 (2013.01); C09D 175/08 (2013.01); C05G 3/0029 (2013.01); B01J 13/14 (2013.01); B01J 13/22 (2013.01)

(58) Field of Classification Search
USPC ......... 428/407; 427/302, 314, 407.5; 524/590
IPC ......... C05G 3/0088,3/0029; B32B 27/40; B01J 13/14, 13/22; C09D 175/08
See application file for complete search history.

(56) References Cited

U.S. PATENT DOCUMENTS

| 3,264,089 A | 8/1966 | Hansen |
| 4,588,803 A * | 5/1986 | Christman ............ 528/78 |
| 4,711,659 A | 12/1987 | Moore |
| 4,804,403 A | 2/1989 | Moore |
| 5,219,465 A | 6/1993 | Goertz et al. |
| 5,300,135 A | 4/1994 | Hudson et al. |
| 5,411,856 A | 5/1995 | Riecke et al. |
| 5,423,897 A | 6/1995 | Hudson et al. |
| 5,429,654 A | 7/1995 | Swarup |
| 5,466,274 A | 11/1995 | Hudson et al. |
| 5,478,375 A | 12/1995 | Hudson |
| 5,538,531 A | 7/1996 | Hudson et al. |
| 5,599,374 A | 2/1997 | Detrick |
| 5,698,002 A | 12/1997 | Hudson |
| 5,803,946 A | 9/1998 | Petcavich et al. |
| 5,984,994 A | 11/1999 | Hudson |
| 5,993,505 A | 11/1999 | Tijsma et al. |
| 6,001,147 A | 12/1999 | Markusch et al. |
| 6,039,781 A | 3/2000 | Goertz et al. |
| 6,165,550 A | 12/2000 | Markusch et al. |
| 6,322,606 B1 * | 11/2001 | Komoriya et al. ............ 71/11 |
| 6,358,296 B1 | 3/2002 | Markusch et al. |
| 6,364,925 B1 | 4/2002 | Markusch et al. |
| 6,617,412 B2 | 9/2003 | Markusch et al. |
| 6,663,686 B1 | 12/2003 | Geiger et al. |
| 7,022,113 B2 | 4/2006 | Lockwood et al. |
| 7,267,707 B2 | 9/2007 | Rosenthal et al. |
| 7,416,785 B2 | 8/2008 | Mente |
| 7,452,399 B2 | 11/2008 | Whittington |
| 7,553,306 B1 | 6/2009 | Hunt et al. |
| 7,615,093 B2 | 11/2009 | Pildysh |
| 7,771,505 B2 | 8/2010 | Ogle et al. |
| 8,034,037 B2 | 10/2011 | Adams et al. |
| 2004/0260230 A1 | 12/2004 | Randolph |
| 2005/0066697 A1 * | 3/2005 | Cline et al. ............ 71/28 |
| 2005/0070858 A1 | 3/2005 | Lockwood et al. |
| 2005/0154359 A1 | 7/2005 | Charlez |
| 2005/0192548 A1 | 9/2005 | Dolliver et al. |

(Continued)

FOREIGN PATENT DOCUMENTS

| EP | 0 600 351 A1 | 6/1994 |
| EP | 0 867 422 A2 | 9/1998 |
| WO | WO 2006/105239 A2 | 10/2006 |
| WO | WO 2013/173705 A1 | 11/2013 |
| WO | WO 2013/173748 A1 | 11/2013 |

OTHER PUBLICATIONS

International Search Report for Application No. PCT/US2013/041640 dated Oct. 8, 2013, 4 pages.
International Search Report for Application No. PCT/US2013/041571 dated Nov. 4, 2013, 5 pages.
International Search Report for Application No. PCT/US2013/041630 dated Apr. 3, 2014, 3 pages.
Database CA [Online] Chemical Abstracts Service, Columbus, Ohio, US; XP000406959, Database accession No. XP000406959, ISSN: 0009-2258, Dec. 2, 1991, 1 page.

Primary Examiner — Leszek Kiliman
(74) Attorney, Agent, or Firm — Howard & Howard Attorneys PLLC

(57) ABSTRACT

An encapsulated particle includes a core particle, a polyurethane layer, and a wax. The polyurethane layer is disposed about the core particle and the wax is disposed about the polyurethane layer. The polyurethane layer includes the reaction product of an isocyanate and a polyol component. The polyol component includes a catalytic polyol derived from an aromatic amine-based initiator and a polyether polyol that is different from the catalytic polyol in a weight ratio of from about 1:2 to about 10:1. A method of encapsulating the core particle includes the steps of providing the core particle, the isocyanate, the polyol component, and the wax. The method also includes the steps of mixing and reacting the isocyanate and the polyol component to form a polyurethane, encapsulating the core particle with the polyurethane layer which comprises the polyurethane, and encapsulating the polyurethane layer with the wax.

28 Claims, No Drawings

(56) References Cited

U.S. PATENT DOCUMENTS

| | | |
|---|---|---|
| 2005/0266245 A1* | 12/2005 | Mente .................... 428/403 |
| 2006/0032282 A1 | 2/2006 | Wynnyk et al. |
| 2006/0222735 A1 | 10/2006 | Rosenthal et al. |
| 2007/0100324 A1 | 5/2007 | Tempel et al. |
| 2007/0191538 A1 | 8/2007 | Apichatachutapan et al. |
| 2008/0125729 A1 | 5/2008 | Gradl |
| 2009/0012484 A1 | 1/2009 | Nielsen et al. |
| 2009/0221990 A1 | 9/2009 | Jaeb et al. |
| 2009/0240218 A1 | 9/2009 | Braga et al. |
| 2009/0264840 A1 | 10/2009 | Virginio |
| 2009/0292263 A1 | 11/2009 | Hudspeth et al. |
| 2009/0306630 A1 | 12/2009 | Locke et al. |
| 2009/0312728 A1 | 12/2009 | Randolph et al. |
| 2009/0326416 A1 | 12/2009 | McNulty et al. |
| 2009/0326488 A1 | 12/2009 | Budig et al. |
| 2010/0010477 A1 | 1/2010 | Augustine et al. |
| 2010/0011825 A1* | 1/2010 | Ogle et al. .................... 71/30 |
| 2010/0036333 A1 | 2/2010 | Schenk, III et al. |
| 2010/0063463 A1 | 3/2010 | Wiesner |
| 2010/0069858 A1 | 3/2010 | Olson |
| 2010/0145289 A1 | 6/2010 | Lina et al. |
| 2010/0160853 A1 | 6/2010 | Smith et al. |
| 2010/0168688 A1 | 7/2010 | Santora et al. |
| 2010/0179493 A1 | 7/2010 | Heagle et al. |
| 2010/0185165 A1 | 7/2010 | Middleton et al. |
| 2010/0204663 A1 | 8/2010 | Wudyka |
| 2010/0211030 A1 | 8/2010 | Turner et al. |
| 2010/0262091 A1 | 10/2010 | Larsson |
| 2010/0262096 A1 | 10/2010 | Hall |
| 2010/0268176 A1 | 10/2010 | Johnson et al. |
| 2010/0280422 A1 | 11/2010 | Hartwell |
| 2010/0286635 A1 | 11/2010 | Watson, Jr. |
| 2010/0286638 A1 | 11/2010 | Malhi |
| 2010/0298790 A1 | 11/2010 | Guidi et al. |
| 2010/0305523 A1 | 12/2010 | Vess |
| 2010/0326152 A1* | 12/2010 | Mente .................... 71/27 |
| 2011/0015590 A1 | 1/2011 | Svedman et al. |
| 2011/0022013 A1 | 1/2011 | Boynton et al. |
| 2011/0028921 A1 | 2/2011 | Hartwell et al. |
| 2011/0077605 A1 | 3/2011 | Karpowicz et al. |
| 2011/0105872 A1 | 5/2011 | Chickering, III et al. |
| 2011/0106027 A1 | 5/2011 | Vess et al. |
| 2011/0106030 A1 | 5/2011 | Scholz |
| 2011/0152799 A1 | 6/2011 | Kevin et al. |
| 2011/0196321 A1 | 8/2011 | Wudyka |
| 2011/0224631 A1 | 9/2011 | Simmons et al. |
| 2011/0270202 A1 | 11/2011 | Boehringer et al. |
| 2011/0276016 A1 | 11/2011 | Tsai |
| 2011/0288510 A1 | 11/2011 | Locke et al. |
| 2011/0295220 A1 | 12/2011 | Heaton et al. |

* cited by examiner

ENCAPSULATED PARTICLE

CROSS-REFERENCE TO RELATED APPLICATIONS

This application claims the benefit of and priority to U.S. Provisional Patent Application Nos. 61/648,707, filed on May 18, 2012, 61/648,766, filed on May 18, 2102 and 61/648,884, filed on May 18, 2012, which are incorporated herewith by reference in their entirety.

This application is related to the following U.S. Non-Provisional patent application assigned to the same assignee, each of which is incorporated herein by reference in its entirety: U.S. patent application Ser. No. 13/896,651, filed on May 17, 2013, entitled "ENCAPSULATED PARTICLE", claiming priority to U.S. Provisional Patent Application No. 61/648,697.

FIELD OF THE DISCLOSURE

The instant disclosure generally relates to an encapsulated particle. More specifically, the instant disclosure relates to an encapsulated particle including a core particle, a polyurethane layer, and a wax.

BACKGROUND

Encapsulated particles that include layers, such as a sulfur layer, and core particles are known in the art. Thickness and external integrity of the sulfur layer limits a rate at which the core particle is released, e.g. dissolves. Prior art encapsulated particles tend to require a large amount of sulfur, e.g. greater than 15% by weight of sulfur based on the total weight of the encapsulated particle, thereby reducing the overall amount of the core particle present in the encapsulated particle. Additionally, a layer consisting of sulfur tends to exhibit brittleness and is subject to breakage during handling. When the sulfur layer breaks or cracks, a portion of the core particle releases quickly and the remainder of the core particle is left partially exposed to water and other liquids which may rapidly dissolve the core particle therefore preventing a controlled release. The rapid dissolution of the core particle is typically undesirable because at least one purpose of encapsulating the core particle is to achieve a controlled release of the core particle over time.

Other prior art encapsulated particles include polyurethane layers as opposed to sulfur layers. However, these encapsulated particles tend to exhibit surface defects and issues with inconsistent external integrity such as partial encapsulation of the core particle by the polyurethane layer, inconsistent thickness of the polyurethane layer, and pits and depressions in the polyurethane layer. Similar to that which is described above, when polyurethane layers with surface defects are disposed about core particles, a portion of the core particle may be left partially exposed or a thin section of the polyurethane layer inconsistent in thickness with the rest of the polyurethane layer may result in water and other liquids rapidly permeating the polyurethane layer. Either scenario described above generally results in rapid dissolution of the core particle, therefore preventing controlled release of the core particle, which is typically undesirable.

Additionally, some encapsulated particles including polyurethane layers agglomerate during the encapsulation process causing a decreased yield of encapsulated particles. Agglomeration typically occurs during encapsulation of the core particles. Agglomeration of the core particles during the encapsulation process tends to reduce encapsulation efficiency, impede complete encapsulation of the core particle by the polyurethane layer, restrict the formation of the polyurethane layer having consistent thickness, increase the amount of the polyurethane layer required relative to the amount of core particles needed to encapsulate the core particle, decrease a yield of encapsulated particles, and cause pits and depressions in the polyurethane layer of the yield of encapsulated particles. Accordingly, there remains a need to develop an improved encapsulated particle and method of encapsulating core particles.

SUMMARY OF THE DISCLOSURE AND ADVANTAGES

An encapsulated particle is disclosed. The encapsulated particle includes a core particle, a polyurethane layer disposed about the core particle, and a wax disposed about the polyurethane layer. The polyurethane layer comprises the reaction product of an isocyanate and a polyol component. The polyol component comprises a catalytic polyol derived from an aromatic amine-based initiator and a polyether polyol that is different from the catalytic polyol in a weight ratio of from about 1:2 to about 10:1. The core particle is encapsulated in a method that includes the steps of providing the core particle, providing the isocyanate, providing the polyol component, and providing the wax. The method also includes the steps of mixing and reacting the isocyanate and the polyol component to form a polyurethane and encapsulating the core particle with the polyurethane layer comprising the polyurethane as well as encapsulating the polyurethane layer with the wax. In addition, a system for encapsulating the core particle with the polyurethane layer is provided. The system includes the isocyanate and the polyol component.

The catalytic polyol imparts elasticity, abrasion resistance, and controlled release properties to the polyurethane layer. Further, the method of encapsulating the core particle promotes more complete encapsulation of the core particle, consistent and minimal thickness of the polyurethane layer, increased yield of encapsulated particles, and minimized defects in the polyurethane layer. Increasing the yield and improving the quality of the encapsulated particle reduces the time and expense required to form the encapsulated particles. In addition, the improved properties of the polyurethane layer allow the encapsulated particle to resist the rapid permeation of water and provide a controlled release, e.g. dissolution, of the core particle.

DETAILED DESCRIPTION

An encapsulated particle includes a core particle, a polyurethane layer disposed about the core particle, and a wax disposed about the polyurethane layer. The core particle typically includes a fertilizer that may include calcium, magnesium, nitrogen, phosphate, potassium, sulfur, and combinations thereof. The fertilizer may be selected from the group of nitrogenous fertilizers, phosphoric fertilizers, potash fertilizers, sulfuric fertilizers, and combinations thereof, e.g. mixed fertilizers. Suitable fertilizers include, but are not limited to, anhydrous ammonia, urea, ammonium nitrate, urea ammonium nitrate, calcium ammonium nitrate, phosphoric acid, mono-ammonium phosphate, ammonium polyphosphate, ammonium phosphate sulfate, potash, ammonium nitrate, ammonium sulfate, sulfuric acid, and combinations thereof. In one embodiment, the fertilizer is a nitrogenous fertilizer such as urea. In another embodiment, the fertilizer is ammonium sulfate.

In embodiments where the core particle includes a fertilizer, the core particle may also include components other than fertilizers. Such other components include, but are not limited to, herbicides, insecticides, fungicides, and other components for use in agricultural applications. However, the encapsulated particle is not limited for use in agricultural applications and the core particle of the instant disclosure is not limited to the fertilizer or other components described immediately above.

Although the shape of the core particle is not critical, core particles having a spherical shape are typical. Accordingly, the core particle is typically either round or roughly spherical. The core particle may be of any size. In one embodiment, the core particle has a particle size of from No. 170 to 5/16 in., alternatively from No. 35 to No. 3½, and alternatively from No. 18 to No. 5 mesh, as measured in accordance with standard sizing techniques using the United States Sieve Series. In another embodiment, the core particle has a particle size of from 0.1 to 10, alternatively from 0.1 to 7, alternatively from 0.5 to 5, alternatively from 1 to 4, and alternatively from 1.5 to 2.5, millimeters (mm). Core particles which are round or roughly spherical and have such particle sizes as described above typically allow for thinner and more uniform polyurethane layers as compared to core particles having other particle sizes.

Referring back to the polyurethane layer, the polyurethane layer may be partially or completely disposed about the core particle. In one embodiment, the polyurethane layer is disposed on at least 75, alternatively at least 95, and alternatively at least 99, % of the core particle. Additionally, it is to be appreciated that the polyurethane layer may comprise a single polyurethane layer or multiple polyurethane layers. In one embodiment, the polyurethane layer comprises at least two polyurethane layers, alternatively at least three polyurethane layers, alternatively at least four polyurethane layers, alternatively at least five polyurethane layers, and alternatively at least six polyurethane layers. It is contemplated that the core particle can be encapsulated with at least one polyurethane layer and one or more additional layers including a material other than a polyurethane.

Typically, each polyurethane layer has an average thickness of from about 5 to 50, alternatively from 10 to 40, and alternatively from 15 to 35, microns. It is to be appreciated that the polyurethane layer can be utilized in various thicknesses depending on one or more desired properties, such as the dissolution rate of the encapsulated particle.

The polyurethane layer includes the reaction product of an isocyanate and a polyol component. The isocyanate may comprise one or more isocyanates. Typically, the isocyanate is an aromatic isocyanate. In one embodiment, the isocyanate includes, but is not limited to, monomeric and polymeric methylene diphenyl diisocyanate, monomeric and polymeric toluene diisocyanate, and mixtures thereof. In another embodiment, the isocyanate is LUPRANATE® M20 commercially available from BASF Corporation of Florham Park, N.J.

Polymeric methylene diphenyl diisocyanates such as LUPRANATE® M20 offer high crosslink density and moderate viscosity. Alternatively, monomeric methylene diphenyl diisocyanates such as LUPRANATE® M Isocyanate offer low viscosity and high NCO content with low nominal functionality. Similarly, toluene diisocyanates such as LUPRANATE® MP102 also offer low viscosity and high NCO content with low nominal functionality. Those skilled in the art will choose a suitable isocyanate based on the desired properties of the polyurethane layer formed therefrom.

Typically, the isocyanate has a viscosity of from 1 to 3,000, alternatively from 20 to 1,000, alternatively from 50 to 300, and alternatively from 600 to 800, centipoise (cP) at 25° C. Isocyanates having low to moderate viscosities facilitate spraying of the isocyanate onto the core particle. The isocyanate typically has a nominal functionality from 1 to 5, alternatively from 1.5 to 4, and alternatively from 2.0 to 2.7, which allows for effective reaction of the isocyanate with the polyol component and improves cost efficiency. Typically, the isocyanate has an NCO content of from 20 to 50, alternatively from 25 to 40, alternatively from 30 to 33, alternatively from 20 to 30, and alternatively from 21 to 25, % by weight. The NCO content provides a high molecular crosslink density that aids in the formation of the polyurethane layer. The NCO content also provides more chemical bonds per unit of mass to improve cost efficiency. The viscosity, the nominal functionality, and the NCO content of the isocyanate may vary outside of the ranges above, but are typically both whole and fractional values within those ranges. In one embodiment, the isocyanate is utilized in an amount from 40 to 60, alternatively from 45 to 55, and alternatively from 48 to 52, % by weight based on the total weight of the isocyanate and the polyol component.

Referring back to the polyol component, the polyol component includes a catalytic polyol derived from an aromatic amine-based initiator and a polyether polyol that is different from the catalytic polyol. In one embodiment, the polyol component includes one or more other polyols different from both the catalytic polyol and the polyether polyol. The polyol component typically includes polyols having at least two OH functional groups. In addition to the OH functional groups, the polyol component can include polyols having one or more NH functional groups.

As a whole, the polyol component has various physical and chemical properties different from, yet dependent upon, the properties of the individual polyols included in the polyol component. Typically, the polyol component has a viscosity of from 100 to 5,000, alternatively from 150 to 3,000, and alternatively from 200 to 2,000, cP at 25° C. The polyol component typically has a nominal functionality of greater than 2, alternatively from 2 to 6, alternatively from 2.5 to 4, and alternatively from 3 to 3.5. Typically, the polyol component has an OH number of from 50 to 600, alternatively from 100 to 500, and alternatively from 150 to 300, mg KOH/g. The viscosity, nominal functionality, and OH number of the polyol component may be any value outside of the ranges above, but are typically both whole and fractional values within those ranges. In one embodiment, the polyol component is utilized in an amount from 40 to 60, alternatively from 45 to 55, and alternatively from 48 to 52, % by weight based on the total weight of the isocyanate and the polyol component.

The catalytic polyol is referred to as a "catalytic" polyol because the catalytic polyol can be used instead of a catalyst to facilitate the chemical reaction of the isocyanate with the polyol component. Said differently, a polyol component that includes the catalytic polyol will typically chemically react with the isocyanate at lower temperatures in the presence of less catalyst (even no catalyst) than a polyol component that does not include the catalytic polyol. As set forth above, the catalytic polyol is derived from an amine-based initiator. However, the catalytic polyol may be formed with more than one initiator. In one embodiment, the catalytic polyol is co-initiated with the amine-based initiator and dipropylene glycol. Without being bound or limited by any particular theory, it is believed that amine content of the catalytic polyol facilitates the reaction of the isocyanate with the polyol component.

The catalytic polyol typically includes alkylene oxide substituents. Examples of suitable alkylene oxides substituents include ethylene oxide, propylene oxide, butylene oxide, amylene oxide, mixtures thereof, alkylene oxide-tetrahydrofuran mixtures, and epihalohydrins.

As previously described above, the catalytic polyol is formed from an aromatic amine-based initiator. In one embodiment, the aromatic amine-based initiator is of the formula:

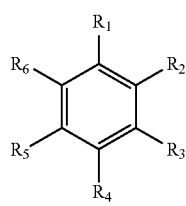

wherein $R_1$ includes one of an alkyl group, an amine group, and a hydrogen, and each of $R_2$-$R_6$ independently include one of an amine group and a hydrogen, so long as at least one of $R_1$-$R_6$ is an amine group. Therefore, it is to be understood that $R_1$ can be any one of an alkyl group, an amine group, or a hydrogen, or any compound including combinations thereof. It is also to be understood that $R_2$-$R_6$ do not have to be identical and each can include an amine group or a hydrogen. It is also to be understood that the terminology "an amine group" may refer to either R—N—H groups or $NH_2$ groups throughout.

The aromatic amine-based initiator may include, but is not limited to, a toluene diamine. Suitable examples of toluene diamine include, but are not limited to, the following formulas and mixtures thereof:

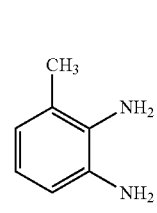
2,3-toluene diamine

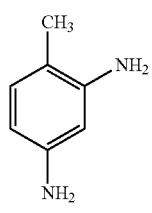
2,4-toluene diamine

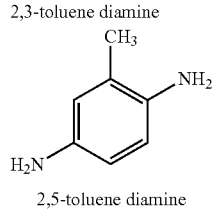
2,5-toluene diamine

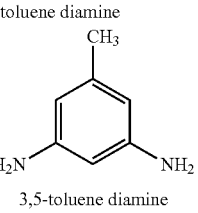
3,5-toluene diamine

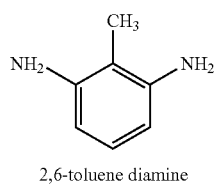
2,6-toluene diamine

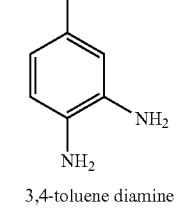
3,4-toluene diamine

Without being bound or limited by any particular theory, it is believed that miscibility between the isocyanate and the polyol minimizes formation of surface defects in the polyurethane layer of the encapsulated particle. For example, when a non-aromatic polyol is combined with an isocyanate such as an aromatic isocyanate, miscibility may be compromised. The non-aromatic polyol may react with the aromatic isocyanate in a partial manner only at an interface resulting in surface defects, such as the pits and depressions, in polyurethane layers formed therefrom. The aromatic amine-based initiator, as described above, tends to yield a catalytic polyol that is miscible with the isocyanate, e.g. completely miscible. It is believed that the miscibility of the isocyanate and the catalytic polyol that is derived from an aromatic amine-based initiator tends to result from two primary effects. First, it is believed that the miscibility is affected by London Forces that create momentarily induced dipoles between similar aromatic moieties of the catalytic polyol and the isocyanate. The momentarily induced dipoles allow the catalytic polyol and the isocyanate to mix effectively. Secondly, it is believed that the miscibility is affected by the planar geometry of the aromatic moieties of the catalytic polyol and the isocyanate that allow for complementary stacking of the catalytic polyol and the isocyanate. As such, the isocyanate and the catalytic polyol mix effectively.

Typically, the catalytic polyol formed from an aromatic amine-based initiator has a viscosity of from 400 to 25,000 and alternatively from 450 to 20,000, cP at 25° C. In one embodiment, the catalytic polyol has a viscosity of from 500 to 2,500, alternatively from 1,000 to 2,000, alternatively from 1,500 to 2,500, and alternatively from 1,800 to 2,000, cP at 25° C. In another embodiment, the catalytic polyol has a viscosity of from 1,000 to 10,000, alternatively from 3,000 to 8,000, and alternatively from 4,500 to 6,000, cP at 25° C. In still another embodiment, the catalytic polyol has a viscosity of from 15,000 to 25,000, alternatively from 16,000 to 20,000, and alternatively from 17,500 to 19,000, cP at 25° C. Typically, the catalytic polyol has a nominal functionality greater than 2.5, alternatively of from 2.5 to 8, alternatively from 2.5 to 4.5, and alternatively from 3.5 to 4.5. The catalytic polyol typically has an OH number of from 100 to 700, alternatively from 200 to 500, alternatively from 250 to 350, mg KOH/g. In another embodiment, the catalytic polyol has an OH number of from 350 to 450 mg KOH/g. In still another embodiment, the catalytic polyol has an OH number of from 400 to 500 mg KOH/g. Typically, the catalytic polyol has a number average molecular weight of from 240 to 2,250, alternatively from 330 to 1,120, and alternatively from 370 to 900, g/mol. The viscosity, nominal functionality, OH number, and number average molecular weight of the catalytic polyol of this embodiment may vary outside of the ranges above, but are typically both whole and fractional values within those ranges. Examples of suitable catalytic polyols are commercially available from BASF Corporation of Florham Park, N.J. under the trade names of PLURACOL® 1168, PLURACOL® 735, and PLURACOL® 1578.

The properties of the catalytic polyol impact the properties of the polyurethane layer. The viscosity of the catalytic polyol impacts spraying of the polyol component onto the core particle. The nominal functionality of the catalytic polyol impacts reaction of the polyol component and the isocyanate. The OH number of the catalytic polyol impacts crosslinking density of the polyurethane layer.

The catalytic polyol is typically present in the polyol component in an amount of from 1 to 95, alternatively from 10 to 65, alternatively from 10 to 45, alternatively from 45 to 55, alternatively from 15 to 35, and alternatively from 5 to 25, parts by weight based on 100 parts by weight of the polyol component. The amount of the catalytic polyol may vary outside of the ranges above, but is typically both whole and fractional values within those ranges.

As described above, the polyol component also includes the polyether polyol. The polyether polyol is typically formed from an initiator and a plurality of alkylene oxide units. In one embodiment, the plurality of alkylene oxide units comprises at least 50% by weight propylene oxide units based on the total weight of the plurality of alkylene oxide units. Alternatively, the plurality of alkylene oxide units comprise at least 50, 60, 70, 80, 90, 95, or 99% by weight propylene oxide units based on the total weight of the plurality of alkylene oxide units. Alternatively still, the plurality of alkylene oxide units may comprise 100% by weight propylene oxide units based on the total weight of the plurality of alkylene oxide units. The polyether polyol typically has a number average molecular weight of greater than 400 g/mol because such a number average molecular weight tends to improve performance properties of the polyurethane layer. More specifically, a polyether polyol having a number average molecular weight of greater than 400 g/mol tends to impart elasticity, abrasion resistance, and controlled release properties to the polyurethane layer. In one embodiment the polyether polyol has a number average molecular weight of from 400 to 15,000, alternatively from 500 to 7,000, and alternatively from 500 to 5,000, g/mol. Typically, the polyether polyol has a viscosity of from 100 to 10,000 and alternatively from 100 to 5,000, cP at 25° C. The polyether polyol typically has a nominal functionality of at least 2.5, alternatively from 2.5 to 5, and alternatively from 2.8 to 3.2. Typically, the polyether polyol has an OH number of from 20 to 300, alternatively from 23 to 275, and alternatively from 25 to 250, mg KOH/g. The number average molecular weight, viscosity, nominal functionality, and OH number of the polyether polyol may be any value outside of the ranges above, but are typically both whole and fractional values within those ranges.

In one embodiment, the polyether polyol is an intermediate molecular weight, secondary hydroxyl terminated polyol. In this embodiment, the polyether polyol is typically initiated with at least one non-amine based, tri-functional initiator. Suitable initiators for initiating the polyether polyol of this embodiment include glycerine, trimethylolpropane, propylene glycol, dipropylene glycol, isopropylene glycol, sorbitol, sucrose, and the like. In this embodiment, the polyether polyol typically has a number average molecular weight of from 470 to 1,400, alternatively from 500 to 1,200, alternatively from 600 to 1,000, and alternatively from 600 to 800, g/mol. Typically, the polyether polyol of this embodiment has a viscosity of from 150 to 700, alternatively from 160 to 600, and alternatively from 170 to 370, cP at 25° C. The polyether polyol of this embodiment typically has a nominal functionality of greater than 2.5, alternatively from 2.75 to 5, and alternatively from 2.8 to 3.2. Typically, the polyether polyol of this embodiment has an OH number of from 100 to 300, alternatively from 180 to 280, and alternatively from 220 to 240, mg KOH/g. The number average molecular weight, viscosity, nominal functionality, and OH number of the polyether polyol of this embodiment may be any value outside of the ranges above, but are typically both whole and fractional values within those ranges. A suitable polyether polyol for this embodiment is commercially available from BASF Corporation of Florham Park, N.J. under the trade name of PLURACOL® GP730.

In another embodiment, the polyether polyol is a polyether triol. In this embodiment, the polyether polyol is typically initiated with at least one non-amine based, tri-functional initiator. Suitable initiators for initiating the polyether polyol of this embodiment include glycerine, trimethylolpropane, propylene glycol, dipropylene glycol, isopropylene glycol, sorbitol, sucrose, and the like. In this embodiment the polyether polyol typically has a number average molecular weight of from 500 to 5,500, alternatively from 1,000 to 5,000, alternatively from 2,000 to 4,000, and alternatively from 2,500 to 3,500, g/mol. Typically, the polyether polyol of this embodiment has a viscosity of from 100 to 1,000, alternatively from 250 to 750, and alternatively from 450 to 650, cP at 25° C. In this embodiment, the polyether polyol typically has a nominal functionality of at least 2.5, alternatively from 2.75 to 5, and alternatively from 2.8 to 3.2. Typically, the polyether polyol of this embodiment has an OH number of from 10 to 100, alternatively from 25 to 75, alternatively from 45 to 65, and alternatively from 50 to 60, mg KOH/g. The number average molecular weight, viscosity, nominal functionality, and OH number of the polyether polyol of this embodiment may be any value outside of the ranges above, but are typically both whole and fractional values within those ranges. One suitable polyether polyol for this embodiment is commercially available from BASF Corporation of Florham Park, N.J. under the trade name of PLURACOL® 4156.

In still another embodiment, the polyether polyol is secondary hydroxyl-terminated graft polyether triol. In this embodiment, the polyether polyol is typically initiated with at least one non-amine based, tri-functional initiator. Suitable initiators for initiating the polyether polyol of this embodiment include glycerine, trimethylolpropane, propylene glycol, dipropylene glycol, isopropylene glycol, sorbitol, sucrose, and the like. In this embodiment the polyether polyol typically has a number average molecular weight of from 1,000 to 10,000, alternatively from 4,000 to 7,000, and alternatively from 5,000 to 6,000, g/mol. Typically, the polyether polyol of this embodiment has a viscosity of from 1,000 to 10,000, alternatively from 3,000 to 6,000, alternatively from 3,000 to 5,000, and alternatively from 4,000 to 5,000, cP at 25° C. In this embodiment, the polyether polyol typically has a nominal functionality of at least 2.5, alternatively from 2.75 to 5, and alternatively from 2.8 to 3.2. Typically, the polyether polyol of this embodiment has an OH number of from 10 to 100, alternatively from 10 to 75, alternatively from 10 to 50, alternatively from 20 to 50, alternatively from 20 to 40, and alternatively from 25 to 35, mg KOH/g. The number average molecular weight, viscosity, nominal functionality, and OH number of the polyether polyol of this embodiment may be any value outside of the ranges above, but are typically both whole and fractional values within those ranges. One suitable polyether polyol for this embodiment is commercially available from BASF Corporation of Florham Park, N.J. under the trade name of PLURACOL® 4600.

The polyether polyol is typically present in the polyol component in an amount of from 10 to 100, alternatively in an amount from 40 to 90, alternatively from 40 to 60, alternatively in an amount from 65 to 85, and alternatively from 75 to 95, parts by weight based on 100 parts by weight of the polyol component. The amount of the polyether polyol may vary outside of the ranges above, but is typically both whole and fractional values within those ranges.

The polyether polyol is typically present in the polyol component in an amount which is greater than the amount of the catalytic polyol. A weight ratio of the polyether polyol to the catalytic polyol in the polyol component is typically of from 1:2 to 10:1, alternatively from 2:1 to 10:1, alternatively from 2:1 to 8:1, alternatively from 2.5:1 to 6:1, alternatively from 5:1 to 6:1, alternatively from 2:1 to 4:1, alternatively from 2.5:1 to 3.5:1, and alternatively from 1:2 to 2:1. The weight ratio of the polyether polyol to the catalytic polyol may vary outside of the ranges above, but is typically both whole and fractional values within those ranges.

Without being bound or limited by any particular theory, it is believed that various properties, ratios, and amounts of the isocyanate and the polyol component described herein minimize agglomeration and formation of surface defects in the polyurethane layer of the encapsulated particle. More specifically, it is believed that the ratio of the polyether polyol to the catalytic polyol, in part, impacts the step of encapsulating the core particle with the polyurethane layer as well as the performance properties of the polyurethane layer. During the step of encapsulating, this ratio contributes to optimal processing conditions, such as viscosity, reaction speed, and non-agglomeration. Furthermore, the ratio contributes a crosslink density and molecular structure needed to form a suitable polyurethane layer, i.e., a polyurethane layer having excellent abrasion resistance and dissolution rate.

In one embodiment, the polyol component or the isocyanate comprises an oil. In one embodiment, the oil is soluble in the polyol component including the catalytic polyol derived from an aromatic amine-based initiator and the polyether polyol that is different from the catalytic polyol. In this embodiment, the oil may further minimize agglomeration of the encapsulated particle during the coating and curing processes. The oil does not substantially chemically react with the isocyanate, the polyol component, or other liquids present during the curing of the polyurethane. In other words, the oil is substantially free from substituent groups which are known to react with the polyol component and/or isocyanate, such as hydroxyl groups and amine groups. In certain embodiments, less than 10, 5, 1, 0.5, or 0.1 wt. % of a total amount of the oil present reacts with the polyol component, the isocyanate, and/or the other liquids present during curing. Alternatively still, in one specific embodiment, none of the oil reacts with the polyol component, the isocyanate, and/or the other liquids present during curing.

The oil can be added to the isocyanate, the polyol component, or may be added to a mixture of the isocyanate and the polyol component. Although not particularly limited, the oil may comprise soybean oil, canola oil, peanut oil, sunflower seed oil, cottonseed oil, methyl esters derived from vegetable oils, and combinations thereof. In one specific embodiment, the oil comprises methyl esters derived from vegetable oils.

If utilized, the oil is typically present in an amount of from 1 to 30, alternatively from 5 to 25, and alternatively from about 10 to 20, % by weight based on the total weight of the isocyanate and the polyol component. However, as will be appreciated by one of ordinary skill in the art, other amounts of the oil may also be used depending on the application of the encapsulated particle.

In another embodiment, the polyurethane layer is formed in the presence of one or more cayalysts. In this embodiment, the polyol component or the isocyanate may include the one or more catalysts. If included, the catalyst is typically included in the polyol component. The catalyst is typically present in the polyol component to catalyze the reaction between the polyol component and the isocyanate. It is to be appreciated that the catalyst is typically not consumed in the reaction between the polyol component and the isocyanate. Examples of suitable catalysts include, but are not limited to, amine catalysts (e.g. gelation catalysts such as amine catalysts in dipropylene glycol, blowing catalysts such as bis (dimethylaminoethyl)ether in dipropylene glycol), metal catalysts, e.g. tin, bismuth, lead, potassium, etc, and organometallic catalysts, e.g. octoates, naphthanates, laurates, acetates, etc. based on, but not limited to, zinc, bismuth, tin, iron, lead, mercury, zirconium calcium, manganese, potassium, and sodium. Specific, non-limiting examples of suitable catalysts include 33% trietylenediamine in dipropylene glycol, dibutyltin dilaurate, 70% potassium octoate in diethylene glycol, potassium acetate in diethylene glycol, potassium acetate, 1,2-dimethylimidizole, and dimethyltin dilaurate.

In yet another embodiment, the polyurethane layer is formed in the presence of a silicone surfactant. Typically, the silicone surfactant comprises a polyorganosiloxane. A non-limiting example of a suitable polyorganosiloxane is an alkyl pendant organosilicone molecule comprising a polysiloxane backbone and polyether side chains. The alkyl pendant organosilicone molecule of this example can be comb structured or dendrimer structured.

Without being bound or limited by any particular theory, it is believed that the silicone surfactant improves the wetting of the polyol component and the isocyanate on the core particle. Accordingly, the silicone surfactant may also be described as a wetting agent. It is also believed that the silicone surfactant further improves the adhesion of the polyurethane layer to the core particle. In addition, it is also believed that the silicone surfactant further reduces clumping and agglomeration of the encapsulated particle during and after the encapsulation process. However, it is to be appreciated that the silicone surfactant is not required.

Generally, the yield of encapsulated particles is a measurement of the amount encapsulated particles that pass through a sieve having 4 mm mesh and have a consistent polyurethane layer disposed thereabout. The silicone surfactant decreases agglomeration of the core particles thereby increasing the yield of encapsulated particles. The encapsulation process typically maximizes the amount of encapsulated particles which are individually formed and free flowing and minimizes the amount of encapsulated particles which are agglomerated, therefore resulting in higher overall yields of encapsulated particles.

In one embodiment, the silicone surfactant is a liquid and has a viscosity of from 100 to 1500, alternatively from 200 to 1,000, and alternatively from 650 to 850, cP at 25° C. The viscosity of the silicone surfactant may vary outside of the ranges above, but is typically both whole and fractional values within those ranges.

Specific examples of suitable silicone surfactants include, but are not limited to, TEGOSTAB® BF 2370, commercially available from Goldschmidt AG of Essen, Del., DABCO® DC5043 commercially available from Air Products and Chemicals, Inc. of Allentown, Pa., and NIAX® Silicone L-5340 and L-620, both commercially available from Momentive Performance Materials of Albany, N.Y. A particularly suitable silicone surfactant is NIAX® Silicone L-620, a polyalkyleneoxidemethylsiloxane copolymer. The silicone surfactant may be present in the polyurethane layer in an amount of from 0.01 to 10, alternatively from 0.05 to 5, and alternatively from 0.1 to 3, parts by weight based on 100 parts by weight of the polyurethane layer. The parts by weight silicone surfactant may vary outside of the ranges above, but is typically both whole and fractional values within those ranges.

The polyurethane layer may optionally include one or more additives. Suitable additives for purposes of the instant disclosure include, but are not limited to, chain-extenders, cross-linkers, chain-terminators, processing additives, adhesion promoters, anti-oxidants, defoamers, flame retardants, catalysts, anti-foaming agents, water scavengers, molecular sieves, fumed silicas, surfactants, ultraviolet light stabilizers, fillers, thixotropic agents, silicones, colorants, pigments, inert diluents, and combinations thereof. For example, a pigment can be included in the polyurethane layer. If included, the additives can be included in the polyurethane layer in various amounts.

In one embodiment, the polyurethane layer is present in the encapsulated particle in an amount of from 1.0 to 30.0, alternatively from 1.0 to 20.0, alternatively from 1.0 to 15.0, alternatively from 1.0 to 10.0, alternatively from 1.0 to 5.0, and alternatively from 2.0 to 5.0, % by weight based on the total weight of the core particle. The amount of polyurethane layer present in the encapsulated particle may vary outside of the ranges above, but is typically both whole and fractional values within those ranges.

The amount of the polyurethane layer present in the encapsulated particle is typically determined using the test procedure described immediately below. Initially, 20 g of the encapsulated particle and 500 g of water, e.g. deionized water, are poured into a standard household blender. The blender is activated and the contents of the blender are mixed until the core particle, e.g. urea, is completely dissolved. The contents of the blender are then filtered for solids using pre-weighed filter paper and a Büchner funnel. The filtrand is then dried at approximately 100° C. to substantially remove residual water present with the filtrand. Typically, the filtrand is dried at 100° C. (in an oven) for approximately 30 minutes. After drying, the filtrand is weighed. The amount (% by weight based on the total weight of the core particle) of the polyurethane layer present in the encapsulated particle is calculated using the amount (in grams) of the filtrand (X) and the amount (in grams) of the core particle (Y) in the following formula:

Polyurethane Layer(% by weight)=100·(X/Y)

X=the amount of the filtrand (in grams) after drying

Y=20(initial amount of the encapsulated particle)−X.

In addition to the polyurethane layer, the encapsulated particle includes a wax disposed about the core particle. More specifically, the wax is disposed on the polyurethane layer and the polyurethane layer is disposed on the core particle. Suitable examples of waxes which may be used include, but are not limited to, organic waxes, thermoplastic polymers, mineral oils, or combinations thereof. More particularly, the wax may comprise paraffinic oil, paraffinic wax, vegetable wax, triglyceride, microcrystalline wax, petrolatum, olefin, polyethylene, petroleum wax, and combinations thereof. In one embodiment, the wax comprises a petroleum wax. In another embodiment, the wax comprises a petroleum wax and at least one other wax. In one embodiment, the wax is present in the encapsulated particle in an amount of from 0.1 to 10.0, alternatively from 0.1 to 5.0, and alternatively from 0.5 to 3.0, % by weight based on the total weight of the core particle. The amount of wax present in the encapsulated particle may vary outside of the ranges above, but is typically both whole and fractional values within those ranges. A specific, non-limiting example of a suitable wax is EVACOTE® 7089A, commercially available from The International Group, Inc. of Toronto, Calif.

The encapsulated particle, including the core particle, the polyurethane layer, and the wax, is typically either round or roughly spherical. A plurality of encapsulated particles typically has a size distribution reported as D[4,3], d(0.1), d(0.5), and/or d(0.9), as well defined and appreciated in the art. In several embodiments, the encapsulated particles have a size distribution D[4,3] of from 0.5 to 5 mm, of from 1 to 4 mm, or of from 1 to 3 mm, with an overall particle size range of from 0.1 to 10 mm. In other embodiments, the encapsulated particles have a size distribution d(0.1) of from 0.2 to 2 mm, of from 0.4 to 1.7 mm, or of from 0.5 to 1.5 mm, with an overall particle size range of from 0.1 to 10 mm. In further embodiments, the encapsulated particles have a size distribution d(0.5) of from 0.5 to 5 mm, of from 1 to 4 mm, or of from 1 to 3 mm, with an overall particle size range of from 0.1 to 10 mm. In still other embodiments, the encapsulated particles have a size distribution d(0.9) of from 0.7 to 7 mm, of from 0.8 to 5 mm, or of from 1 to 4 mm, with an overall particle size range of from 0.1 to 10 mm. The D[4,3], d(0.1), d(0.5), and d(0.9) size distributions of the encapsulated particles may vary outside of the ranges above, but are typically both whole and fractional values within those ranges.

Both the polyurethane layer and the wax of the encapsulated particle impacts dissolution rate of the core particle. Dissolution rate is the rate at which the core particle, e.g. urea, dissolves in water. To calculate the dissolution rate, dissolution (%) is determined. More specifically, dissolution (%) is determined using the test procedure described immediately below. Initially, 50 g of the encapsulated particle and 235 g of water are poured into a 250 mL wide-mouth plastic bottle (bottle). The bottle is placed into an oven set at 38° C. A sample of liquid is taken from the bottle after 7 days of aging at 38° C. The refractive index of the sample is measured using a refractometer. An amount (in grams) of the core particle dissolved in the sample is calculated using the refractive index and a temperature-corrected standard curve. The amount of the core particle dissolved is utilized to calculate dissolution (%) (percent of the core particle dissolved) with the following formula:

Dissolution(%)=X/(50−(% Coating/2))

X=the amount of the core particle (grams) dissolved in the sample.

% Coating=100%·Weight of Applied Coating/Weight of Coated Core Particle

Typically, the core particle has a dissolution of less than 60, alternatively less than 50, alternatively less than 40, alternatively less than 30, alternatively less than 20, and alternatively less than 10, % by weight after 7 days of aging the encapsulated particle in water at 38° C.

Dissolution can also be determined after the encapsulated particle is abraded to test the durability of the coating formed thereon. To abrade a sample of the encapsulated particle, the encapsulated particle is poured through a pipe. More specifically, the sample of the encapsulated particle weighing 75 grams is poured into a top end of the pipe which is 6' long and 6" in diameter and positioned vertically. The sample is collected at a bottom end of the pipe. The sample is poured through the pipe 5 times. After abrasion, the dissolution of the core particle is tested to determine whether the dissolution changed following abrasion as described immediately above. After abrasion, the core particle typically has a dissolution of less than 70, alternatively less than 50, and alternatively less than 25, % by weight after 7 days of aging in water at 38° C.

In addition to the encapsulated particle, the instant disclosure relates to a system for forming the encapsulated particle and a method of encapsulating the core particle with the polyurethane layer and the wax. The system for encapsulating the core particle with the polyurethane layer includes the isocyanate and the polyol component. The method includes the steps of providing the core particle, the isocyanate, the polyol component, and the wax. The method also includes the steps of mixing and reacting the isocyanate and the polyol component to form a polyurethane and encapsulating the core particle with a polyurethane layer which comprises the polyurethane, which are described in greater detail below. Additionally, the method further includes the step of encapsulating the polyurethane layer with the wax, which is also described in greater detail below.

The method includes the step of mixing and reacting the isocyanate and the polyol component. The isocyanate and the polyol component are mixed and the isocyanate and the polyol component chemically react to form a polyurethane. The step of mixing and reacting the isocyanate and the polyol component can be conducted prior to the step of encapsulating the core particle with the polyurethane layer comprising the polyurethane. Alternatively, the step of mixing and reacting the isocyanate and the polyol component can be conducted simultaneous with the step of encapsulating the core particle with the polyurethane layer comprising the polyurethane.

The isocyanate and the polyol component may be combined using one or more techniques including, but not limited to, pouring, pan coating, fluidized-bed coating, co-extrusion, mixing, spraying and spinning disk encapsulation. In one embodiment, the isocyanate and the polyol component are mixed by spraying into or above a reaction vessel such as a barrel, a drum, mixer, or the like. The isocyanate and the polyol component can be mixed and sprayed into or above the reaction vessel with a single spray gun or multiple spray guns. In one embodiment, the isocyanate and the polyol component are impingement mixed in a spray nozzle. The isocyanate and the polyol component can also be sequentially sprayed into or above the reaction vessel with a single spray gun and mixed in the reaction vessel. Alternatively, the isocyanate and the polyol component can be simultaneously or sequentially sprayed into or above the reaction vessel with different spay guns. Spraying the isocyanate and the polyol component tends to reduce agglomeration of the core particle and results in improved yield of the encapsulated particle.

The method optionally includes the steps of spraying the isocyanate onto the core particle and spraying the polyol component onto the core particle. The step of spraying the isocyanate onto the core particle can be conducted prior to the step of spraying the polyol component onto the core particle. Alternatively, the step of spraying the isocyanate onto the core particle can be conducted subsequent to the step of spraying the polyol component onto the core particle. The step of spraying the isocyanate onto the core particle can also be conducted prior to the step of spraying the polyol component onto the core particle and repeated after the step of spraying the polyol component onto the core particle. It is also contemplated that the isocyanate and the polyol component can be sprayed simultaneously and/or sequentially numerous times in various sequences onto the core particle and onto each other.

As just one non-limiting example, the isocyanate and the polyol component can be sprayed onto the core particle in the following sequence: (1) a portion of the isocyanate is sprayed onto the core particle; (2) a portion of the of the polyol component is sprayed onto the core particle; (3) a remaining portion of the isocyanate is sprayed onto the core particle; and (4) a remaining portion of the polyol component is sprayed onto the core particle. As another example, the isocyanate and the polyol component can be sprayed onto the core particle in the following sequence: (1) a portion of the isocyanate is sprayed onto the core particle; (2) a portion of the of the polyol component is sprayed onto the core particle and a remaining portion of the isocyanate is sprayed onto the core particle simultaneously; and (3) a remaining portion of the polyol component is sprayed onto the core particle.

In another embodiment, the silicone surfactant is provided with the isocyanate, provided with the polyol component, and/or provided independently. In another embodiment, the silicone surfactant can be used to pre-treat the surface of the core particle prior to the step of encapsulation. In still another embodiment, the silicone surfactant is provided with the polyol component, e.g., mixed with the polyol component prior to the step of mixing the isocyanate and the polyol component. In other words, the silicone surfactant can be provided in multiple ways.

The method optionally includes the step(s) of heating the isocyanate, the polyol component, the silicone surfactant (if present), and/or the core particles prior to, or simultaneous with, the step of mixing the isocyanate and the polyol component. The isocyanate, the polyol component, the silicone surfactant (if present), and/or the core particles may be individually heated or heated in combination with one or more of each other. The isocyanate, polyol component, and the core particle are typically heated prior to or simultaneous with the step of encapsulating the core particle. In one embodiment, the isocyanate, polyol component, and the core particle are heated to a temperature of greater than 20, alternatively to a temperature of from 20 to 100, alternatively from 40 to 90, and alternatively from 50 to 80, ° C.

As alluded to above, when the isocyanate and the polyol component are mixed, the isocyanate and the polyol component chemically react to form the polyurethane and more specifically, the polyurethane layer comprising the polyurethane. In one embodiment, the isocyanate and the polyol component are reacted at an isocyanate index of greater than 80, alternatively from 80 to 200, alternatively from 110 to 190, and alternatively from 120 to 180. In various embodiments, the isocyanate and the polyol component are reacted at isocyanate indexes of from 125 to 180; alternatively from 130 to 180; alternatively from 135 to 180; alternatively from 140 to 180; alternatively from 145 to 180; alternatively from 150 to 180; alternatively from 155 to 180; alternatively from 160 to 180; alternatively from 165 to 180; and alternatively from 170 to 180. The isocyanate index may vary outside of the ranges above, but is typically both whole and fractional values within 80 to 200. As well known in the art, isocyanate index is a ratio of an actual molar amount of isocyanate(s) reacted with the polyol(s) to a stoiciometric molar amount of isocyanate(s) needed to react with an equivalent molar amount of the polyol(s).

The step of encapsulation can occur once or can be repeated. If repeated, the step does not have to be the same each individual time. The core particle may be encapsulated one time with a single polyurethane layer or multiple times with multiple polyurethane layers. It is contemplated that the core particle can be encapsulated with at least one polyurethane layer and one or more additional layers including a material other than polyurethane. In one embodiment, the polyurethane layer is disposed on at least 75, alternatively at least 95, and alternatively at least 99, % of the core particle. Said differently, the core particle may be partially or totally encapsulated by the polyurethane layer.

The method optionally includes the step of heating and/or agitating the encapsulated particle to reduce agglomeration, after the polyol component and the isocyanate are mixed to encapsulate the core particle. The encapsulated particle may be heated and/or agitated in the reaction vessel or in any container. In one embodiment, the encapsulated particle is heated in a jacketed system and agitated in a mechanical mixer such as a ribbon blender, a plough blender, a processing mixer, an impingement mixer, a rotating drum mixer, and combinations thereof. In this embodiment, the encapsulated particle is typically heated at a temperature of from 20 to 200, alternatively from 150 to 200, alternatively from 170 to 190, alternatively from 40 to 90, and alternatively from 50 to 80° C. In a preferred embodiment, the encapsulated particle is typically heated at a temperature of from 170 to 190° C. Additionally, the encapsulated particle in this embodiment is typically heated for a period of time of from 0.5 to 60, alternatively from 2 to 30, and alternatively from 4 to 20, minutes.

The step of agitating the encapsulated particle may include, but is not limited to, stirring the encapsulated particle, mixing the encapsulated particle, shaking the encapsulated particle, and combinations thereof. In one embodiment, the encapsulated particle is agitated for a period of time of from 0.5 to 60, alternatively from 2 to 30, and alternatively from 4 to 20, minutes.

The method further includes the step of encapsulating the polyurethane layer with the wax. In one embodiment, the wax is provided and melted. The molten wax is then added to the core particle having the polyurethane layer disposed thereon to form the encapsulated particle. Typically, after the molten wax is added to the core particle having the polyurethane layer disposed thereon, the core particle is agitated until the molten wax cools and solidifies to form the encapsulated particle.

In one particular embodiment, the core particle includes nitrogen fertilizer such as urea. In this embodiment, the core particle is preheated to a temperature of 150° F. and then loaded into a rotating drum. The catalytic polyol and the polyether polyol are pre-blended to form the polyol component, and the polyol component, additives (if present), and the silicone surfactant (if present) are pre-blended to form the polyol component. If present, the silicone surfactant is added to the polyol component in an amount of 1 part by weight based on 100 parts by weight of the polyol component. The isocyanate and the polyol component are also preheated to a temperature of 150° F. The isocyanate and the polyol component are sprayed sequentially onto the core particle at an isocyanate index of 130 to 150 and the formation of the polyurethane layer occurs with no additional heating, i.e., at ambient temperatures. In this embodiment, one half of the isocyanate is sprayed onto the core particle and the contents of the drum are agitated for from 1 to 5 minutes. Subsequently, all of the polyol component is sprayed onto the core particle and the contents of the drum are agitated for from 1 to 5 minutes. A remaining portion of the isocyanate is sprayed onto the core particle and the contents of the drum are agitated for from 5 to 10 minutes. Finally, the contents of the drum are removed, added to a vessel, and preheated to 180° F. Molten wax is then added to the vessel. The contents of the vessel are agitated until cooled to ambient temperature and the molten wax solidifies thereby forming the encapsulated particle.

The following examples illustrate the nature of the instant disclosure and are not to be construed as limiting of the instant disclosure. Unless otherwise indicated, all parts are given as parts by weight.

EXAMPLES

Inventive Encapsulated Particles 1-30 are described herein. Inventive Encapsulated Particles 1-30 are encapsulated particles formed in accordance with the instant disclosure.

To form Inventive Encapsulated Particles 1-30, a polyurethane layer and a wax are disposed about a core particle. The compositions used to form Inventive Encapsulated Particles 1-30, in grams and weight percent, are set forth below in Table 1. A polyol component is prepared by mixing, in a first vessel, a catalytic polyol derived from an aromatic amine-based initiator and a polyether polyol that is different from the catalytic polyol, as set forth in Table 1 below. The polyol component, in the first vessel, is preheated to a temperature of 150° F. An isocyanate, as set forth in Table 1 below, is preheated to a temperature of 150° F. in a second vessel. The core particle, as set forth in Table 1 below, is preheated to a temperature of 150° F. in a third vessel. Once preheated, the core particle is added to a reaction vessel having a roller speed of 26 rpm. The reaction vessel is not heated. Subsequently, one-half of the total weight of the isocyanate, which is preheated, is added to the reaction vessel and agitated for 2 minutes with the core particle. Next, all of the polyol component, which is preheated, is added to the reaction vessel and agitated with the isocyanate and the core particle previously added, for 10 minutes. The remaining isocyanate, i.e., the other one-half of the isocyanate is added to the reaction vessel and agitated, with the polyol component, the one-half of the isocyanate, and the core particle previously added, for 10 minutes. During agitation, the polyol component and the isocyanate react to form the polyurethane layer disposed about the core particle. A portion of the polyurethane coated core particles are placed in a beaker and preheated to 180° F. Molten wax is added to the beaker and the contents of which are stirred by hand using a tongue depressor. The mixture is cooled to ambient temperature and the molten wax solidifies to form a wax and the Inventive Encapsulated Particles 1-30.

Inventive Encapsulated Particles 1-30 are evaluated to determine performance properties including agglomeration (clumping) and dissolution (%). Additionally, Inventive Encapsulated Particles 25-30 are evaluated to determine durability via abrasion testing. The results of the evaluations are also set forth in Table 1 below.

TABLE 1

|  | Particle 1 | Particle 2 | Particle 3 | Particle 4 | Particle 5 | Particle 6 |
|---|---|---|---|---|---|---|
| Catalytic Polyol A (wt. % of Polyol Component) | 25 | 25 | — | 25 | 25 | — |
| Catalytic Polyol B (wt. % of Polyol Component) | — | — | 15 | — | — | 15 |
| Catalytic Polyol C (wt. % of Polyol Component) | — | — | — | — | — | — |
| Polyether Polyol A (wt. % of Polyol Component) | 75 | 75 | 85 | 75 | 75 | 85 |
| Polyether Polyol B (wt. % of Polyol Component) | — | — | — | — | — | — |
| Polyether Polyol C (wt. % of Polyol Component) | — | — | — | — | — | — |
| Polyol Component (g) | 45 | 67.5 | 43.6 | 45 | 67.5 | 43.6 |

TABLE 1-continued

|  |  |  |  |  |  |  |
|---|---|---|---|---|---|---|
| Isocyanate (g) | 45 | 67.5 | 46.4 | 45 | 67.5 | 46.4 |
| Core Particle (g) | 3000 | 3000 | 3000 | 3000 | 3000 | 3000 |
| Total (g) | 3090 | 3135 | 3090 | 3090 | 3135 | 3090 |
| Number of Polyurethane Layers | 2 | 3 | 2 | 2 | 3 | 2 |
| Polyurethane Layer (wt. %) | 3 | 4.5 | 3 | 3 | 4.5 | 3 |
| Wax (wt. %) | 1 | 1 | 1 | 2 | 2 | 2 |
| Agglomeration | good | good | good | good | good | good |
| Abraded* | n/a | n/a | n/a | n/a | n/a | n/a |
| Dissolution (%) Day 7 | 46.7 | 7.9 | 20.2 | 37.4 | 3.3 | 19.6 |

|  | Particle 7 | Particle 8 | Particle 9 | Particle 10 | Particle 11 | Particle 12 |
|---|---|---|---|---|---|---|
| Catalytic Polyol A (wt. % of Polyol Component) | — | — | — | — | — | — |
| Catalytic Polyol B (wt. % of Polyol Component) | — | — | — | — | — | — |
| Catalytic Polyol C (wt. % of Polyol Component) | 50 | 40 | 50 | 35 | 35 | 35 |
| Polyether Polyol A (wt. % of Polyol Component) | — | — | — | — | — | — |
| Polyether Polyol B (wt. % of Polyol Component) | 50 | 60 | — | — | — | — |
| Polyether Polyol C (wt. % of Polyol Component) | — | — | 50 | 65 | 65 | 65 |
| Polyol Component (g) | 6 | 6 | 6 | 6 | 6.56 | 7 |
| Isocyanate (g) | 6 | 6 | 6 | 6 | 5.44 | 5 |
| Core Particle (g) | 400 | 400 | 400 | 400 | 400 | 400 |
| Total (g) | 412 | 412 | 412 | 412 | 412 | 412 |
| Number of Polyurethane Layers | 2 | 2 | 2 | 2 | 2 | 2 |
| Polyurethane Layer (wt. %) | 3 | 3 | 3 | 3 | 3 | 3 |
| Wax (wt. %) | 1 | 1 | 1 | 1 | 1 | 1 |
| Agglomeration | good | good | good | good | good | good |
| Abraded* | n/a | n/a | n/a | n/a | n/a | n/a |
| Dissolution (%) Day 7 | 10.2 | 52.6 | 8.8 | 12.6 | 16.2 | 17.7 |

|  | Particle 13 | Particle 14 | Particle 15 | Particle 16 | Particle 17 | Particle 18 |
|---|---|---|---|---|---|---|
| Catalytic Polyol A (wt. % of Polyol Component) | — | — | — | — | — | — |
| Catalytic Polyol B (wt. % of Polyol Component) | — | — | — | — | — | — |
| Catalytic Polyol C (wt. % of Polyol Component) | 50 | 40 | 50 | 35 | 35 | 35 |
| Polyether Polyol A (wt. % of Polyol Component) | — | — | — | — | — | — |
| Polyether Polyol B (wt. % of Polyol Component) | 50 | 60 | — | — | — | — |
| Polyether Polyol C (wt. % of Polyol Component) | — | — | 50 | 65 | 65 | 65 |
| Polyol Component (g) | 6 | 6 | 6 | 6 | 6.56 | 7 |
| Isocyanate (g) | 6 | 6 | 6 | 6 | 5.44 | 5 |
| Core Particle (g) | 400 | 400 | 400 | 400 | 400 | 400 |
| Total (g) | 412 | 412 | 412 | 412 | 412 | 412 |
| Number of Polyurethane Layers | 2 | 2 | 2 | 2 | 2 | 2 |
| Polyurethane Layer (wt. %) | 3 | 3 | 3 | 3 | 3 | 3 |
| Wax (wt. %) | 2 | 2 | 2 | 2 | 2 | 2 |
| Agglomeration | good | good | good | good | good | good |
| Abraded* | n/a | n/a | n/a | n/a | n/a | n/a |
| Dissolution (%) Day 7 | 11.4 | 46.6 | 6.2 | 11.5 | 14.9 | 14.9 |

|  | Particle 19 | Particle 20 | Particle 21 | Particle 22 | Particle 23 | Particle 24 |
|---|---|---|---|---|---|---|
| Catalytic Polyol A (wt. % of Polyol Component) | — | — | — | — | — | — |
| Catalytic Polyol B (wt. % of Polyol Component) | — | 30 | 50 | — | 30 | 50 |

TABLE 1-continued

|  | | | | | | |
|---|---|---|---|---|---|---|
| Catalytic Polyol C (wt. % of Polyol Component) | 50 | — | — | 50 | — | — |
| Polyether Polyol A (wt. % of Polyol Component) | — | 70 | — | — | 70 | — |
| Polyether Polyol B (wt. % of Polyol Component) | 50 | — | 50 | 50 | — | 50 |
| Polyether Polyol C (wt. % of Polyol Component) | — | — | — | — | — | — |
| Polyol Component (g) | 45.3 | 45.3 | 43.5 | 45.3 | 45.3 | 43.5 |
| Isocyanate (g) | 44.7 | 44.7 | 43.2 | 44.7 | 44.7 | 43.2 |
| Core Particle (g) | 3000 | 3000 | 3000 | 3000 | 3000 | 3000 |
| Total (g) | 3090 | 3090 | 3086.7 | 3090 | 3090 | 3086.7 |
| Number of Polyurethane Layers | 2 | 2 | 2 | 2 | 2 | 2 |
| Polyurethane Layer (wt. %) | 3 | 3 | 3 | 3 | 3 | 3 |
| Wax (wt. %) | 1 | 1 | 1 | 2 | 2 | 2 |
| Agglomeration | good | good | good | good | good | good |
| Abraded* | n/a | n/a | n/a | n/a | n/a | n/a |
| Dissolution (%) Day 7 | 38.8 | 37.6 | 24.3 | 32.5 | 35.7 | 19.7 |

|  | Particle 25 | Particle 26 | Particle 27 | Particle 28 | Particle 29 | Particle 30 |
|---|---|---|---|---|---|---|
| Catalytic Polyol A (wt. % of Polyol Component) | 25 | 25 | 25 | 25 | 25 | 25 |
| Catalytic Polyol B (wt. % of Polyol Component) | — | — | — | — | — | — |
| Catalytic Polyol C (wt. % of Polyol Component) | — | — | — | — | — | — |
| Polyether Polyol A (wt. % of Polyol Component) | 75 | 75 | 75 | 75 | 75 | 75 |
| Polyether Polyol B (wt. % of Polyol Component) | — | — | — | — | — | — |
| Polyether Polyol C (wt. % of Polyol Component) | — | — | — | — | — | — |
| Polyol Component (g) | 90.7 | 45.3 | 90.7 | 68 | 113.3 | 121..4 |
| Isocyanate (g) | 69.3 | 34.7 | 69.3 | 52 | 86.7 | 78.6 |
| Core Particle (g) | 4000 | 4000 | 4000 | 4000 | 4000 | 4000 |
| Total (g) | 4160 | 4080 | 4160 | 4120 | 4200 | 4200 |
| Number of Polyurethane Layers | 2 | 2 | 2 | 2 | 2 | 2 |
| Polyurethane Layer (wt. %) | 4 | 2 | 4 | 3 | 5 | 5 |
| Wax (wt. %) | 2 | 4 | 3 | 3 | 1 | 2 |
| Agglomeration | good | good | good | good | good | good |
| Abraded* Dissolution (%) Day 7 | 46.2 | 48.4 | 36.3 | 37.8 | 37.2 | 23.8 |
| Dissolution (%) Day 7 | 43.9 | 47.9 | 34.2 | 36.7 | 34.8 | 20.9 |

*Inventive Encapsulated Particles 25-30 are evaluated for durability by pouring samples of Inventive Encapsulated Particles 25-30 through a pipe prior to dissolution. More specifically, a sample of inventive encapsulated particles weighing 75 grams is poured into a top end of the pipe which is 6' long and 6" in diameter and positioned vertically. The sample is collected at a bottom end of the pipe. The sample is poured through the pipe 5 times and labeled "abraded".

Catalytic Polyol A is PLURACOL® 1168, an aromatic amine-initiated polyol commercially available from BASF Corporation of Florham Park, N.J.

Catalytic Polyol B is PLURACOL® 735, an aromatic amine-initiated polyol commercially available from BASF Corporation of Florham Park, N.J.

Catalytic Polyol C is PLURACOL® 1578, an aromatic amine-initiated polyol commercially available from BASF Corporation of Florham Park, N.J.

Polyether Polyol A is PLURACOL® GP730, a polyether polyol commercially available from BASF Corporation of Florham Park, N.J.

Polyether Polyol B is PLURACOL® 4156, a polyether polyol commercially available from BASF Corporation of Florham Park, N.J.

Polyether Polyol C is PLURACOL® 4600, a polyether polyol commercially available from BASF Corporation of Florham Park, N.J.

Isocyanate is LUPRANATE® M20, a polymeric methylene diphenyl diisocyanate commercially available from BASF Corporation of Florham Park, N.J.

Core Particle is urea spheres +5/−16 Mesh, Size Guide Number 225-255, Uniformity Index 45-55.

Agglomeration is determined based on an objective observation of the Encapsulated Particles as they are passed through a sieve having 4 mm mesh. When the Encapsulated Particles agglomerate or clump together and do not pass through the sieve, an observation of "clumps" is recorded. Alternatively, when the Encapsulated Particles pass through the sieve freely, an observation of "good" is recorded. Agglomeration is typically indicative of reduced yield of the encapsulated particle and higher dissolution rates of the Core Particle.

Dissolution is determined using the test procedure described immediately below. Initially, 50 g of coated urea particles and 235 g of water are poured into a 250 mL wide-mouth plastic bottle (bottle). The bottle is placed into an oven set at 38° C. A sample of liquid is taken from the bottle after 7 days of aging at 38° C. The refractive index of the sample is measured using a refractometer. An amount (in grams) of urea dissolved in each sample is calculated using the refractive index reading and a temperature-corrected standard curve. The amount of urea dissolved is utilized to calculate dissolution (percent urea dissolved) with the following formula:

Dissolution(%)=$X$/(50−(% Coating/2))

$X$=the amount of urea (grams) dissolved in the sample.

% Coating=100%×Weight of Applied Coating/Weight of Coated Urea

Referring now to the data from Table 1, Inventive Encapsulated Particles 1-30 have excellent performance properties. More specifically, Inventive Encapsulated Particles 1-30 do not agglomerate and have slow dissolution rates, i.e. excellent controlled release properties. Further, samples of Inventive Encapsulated Particles 25-30 which are "abraded", as described above, exhibit excellent durability.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the instant disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the instant disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The instant disclosure has been described in an illustrative manner, and it is to be understood that the terminology which has been used is intended to be in the nature of words of description rather than of limitation. Obviously, many modifications and variations of the instant disclosure are possible in light of the above teachings. It is, therefore, to be understood that within the scope of the appended claims, the instant disclosure may be practiced otherwise than as specifically described.

What is claimed is:

1. An encapsulated particle comprising:
A. a core particle;
B. a polyurethane layer disposed about said core particle and comprising the reaction product of;
  (i) a monomeric and/or polymeric methylene diphenyl diisocyanate, and
  (ii) a polyol component comprising;
    a. a catalytic polyol derived from an aromatic amine-based initiator, and
    b. a polyether polyol that is different from said catalytic polyol; and
C. a wax layer disposed about said polyurethane layer, said wax layer comprising a wax present in an amount of from 0.5 to 3.0% by weight based on the total weight of said core particle;
wherein the weight ratio of said catalytic polyol to said polyether polyol in said polyol component is from about 1:2 to about 10:1; and
wherein said core particle has a dissolution of less than 60% by weight after 7 days of aging said encapsulated particle in water at 38° C.

2. An encapsulated particle as set forth in claim 1 wherein said aromatic amine-based initiator comprises the formula:

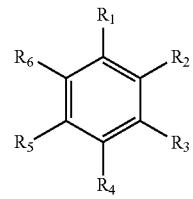

wherein $R_1$ comprises one of an alkyl group, an amine group, and a hydrogen; and
wherein each of $R_2$-$R_6$ independently comprise one of an amine group and a hydrogen, so long as at least one of $R_1$-$R_6$ is an amine group.

3. An encapsulated particle as set forth in claim 1 wherein said catalytic polyol has a nominal functionality of from about 2.5 to about 8 and hydroxyl number of from about 100 to about 700 mg KOH/g.

4. An encapsulated particle as set forth in claim 1 wherein said catalytic polyol has a viscosity at 25° C. of from about 400 to about 25,000 cP.

5. An encapsulated particle as set forth in claim 1 wherein said catalytic polyol has a number average molecular weight of from about 240 to about 2,250 g/mol.

6. An encapsulated particle as set forth in claim 1 wherein said polyether polyol has a nominal functionality of from about 2.5 to about 5 and hydroxyl number of from about 20 to about 300 mg KOH/g.

7. An encapsulated particle as set forth in claim 1 wherein said polyether polyol has a viscosity at 25° C. of from about 100 to about 10,000 cP.

8. An encapsulated particle as set forth in claim 1 wherein said polyether polyol has a number average molecular weight of from about 400 to about 15,000 g/mol.

9. An encapsulated particle as set forth in claim 1 wherein said wax comprises a petroleum wax.

10. An encapsulated particle as set forth in claim 1 wherein said core particle comprises urea.

11. An encapsulated particle as set forth in claim 1 wherein said polyurethane layer is further defined as the reaction product of said isocyanate and said polyol component reacted in the presence of a silicone surfactant.

12. An encapsulated particle as set forth in claim 11 wherein said silicone surfactant comprises a polyorganosiloxane.

13. An encapsulated particle as set forth in claim 1 wherein said core particle has a dissolution of less than 25% by weight after 7 days of aging said encapsulated particle in water at 38° C.

14. A method of encapsulating a core particle, said method comprising the steps of:
A. providing a core particle;
B. providing a monomeric and/or polymeric methylene diphenyl diisocyanate;
C. providing a polyol component comprising;
    a. a catalytic polyol derived from an aromatic amine-based initiator, and
    b. a polyether polyol that is different from the catalytic polyol;
E. providing a wax;
F. mixing and reacting the monomeric and/or polymeric methylene diphenyl diisocyanate and the polyol component to form a polyurethane;
G. encapsulating the core particle with a polyurethane layer which comprises the polyurethane; and
H. encapsulating the polyurethane layer with a wax layer comprising the wax, the wax present in an amount of from 0.5 to 3.0% by weight based on the total weight of the core particle,
wherein the weight ratio of the catalytic polyol to the polyether polyol of the polyol component is from about 1:2 to about 10:1; and
wherein the core particle has a dissolution of less than 60% by weight after 7 days of aging the encapsulated particle in water at 38° C.

15. A method as set forth in claim 14 wherein the wax comprises a petroleum wax.

16. A method as set forth in claim 14 wherein the core particle comprises urea.

17. A method as set forth in claim 14 wherein the polyurethane layer is further defined as the reaction product of the isocyanate and the polyol component reacted in the presence of a silicone surfactant.

18. A method as set forth in claim 17 wherein the silicone surfactant comprises a polyorganosiloxane.

19. A method as set forth in claim 14 further comprising the step of heating at least one of the core particle, the isocyanate, and the polyol component to a temperature greater than 40° C. prior to or simultaneous with the step of mixing the isocyanate and the polyol component.

20. A method as set forth in claim 14 wherein the step of mixing the isocyanate and the polyol component is conducted prior to the step of encapsulating the core particle with the polyurethane layer.

21. A method as set forth in claim 14 wherein the step of mixing the isocyanate and the polyol component is conducted simultaneous with the step of encapsulating the core particle with the polyurethane layer.

22. A method as set forth in claim 21 further comprising the step of spraying the isocyanate onto the core particle and the step of spraying the polyol component onto the core particle.

23. A method as set forth in claim 22 wherein the step of spraying the isocyanate onto the core particle is conducted prior to the step of spraying the polyol component onto the core particle.

24. A system for encapsulating a core particle with a polyurethane layer and a wax layer, said system comprising:
A. a monomeric and/or polymeric methylene diphenyl diisocyanate; and
B. a polyol component comprising:
    i. a catalytic polyol derived from an aromatic amine-based initiator comprising the formula:

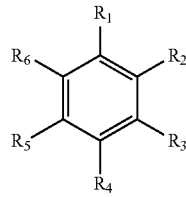

wherein $R_1$ comprises one of an alkyl group, an amine group, and a hydrogen; and
wherein each of $R_2$-$R_6$ independently comprise one of an amine group and
a hydrogen, so long as at least one of $R_1$-$R_6$ is an amine group, and
    ii. a polyether polyol that is different from said catalytic polyol;
wherein the weight ratio of said catalytic polyol to said polyether polyol of said polyol component is from about 1:2 to about 10:1;
wherein said wax layer comprises a present in amount of from 0.5 to 3.0% by weight based on the total weight of said core particle; and
wherein said core particle has a dissolution of less than 60% by weight after 7 days of aging the encapsulated particle in water at 38° C.

25. A system as set forth in claim 24 wherein said catalytic polyol has a nominal functionality of from about 2.5 to about 8 and hydroxyl number of from about 100 to about 700 mg KOH/g,
a viscosity at 25° C. of from about 400 to about 25,000 cP, and
a number average molecular weight of from about 240 to about 2,250 g/mol.

26. A system as set forth in claim 24 wherein said polyether polyol has a nominal functionality of from about 2.5 to about 5 and hydroxyl number of from about 20 to about 300 mg KOH/g,
a viscosity at 25° C. of from about 100 to about 10,000 cP, and
a number average molecular weight of from about 400 to about 15,000 g/mol.

27. A system as set forth in claim 24 further including a wax for encapsulating said polyurethane layer.

28. A system as set forth in claim 24 further comprising a silicone surfactant.

* * * * *

UNITED STATES PATENT AND TRADEMARK OFFICE
CERTIFICATE OF CORRECTION

PATENT NO. : 9,067,842 B2  
APPLICATION NO. : 13/896975  
DATED : June 30, 2015  
INVENTOR(S) : Raymond Neff et al.

Page 1 of 1

It is certified that error appears in the above-identified patent and that said Letters Patent is hereby corrected as shown below:

Title page, item (73), Assignee, after "Ludwigshafen", please delete "DK" and replace with -- DE --

Signed and Sealed this  
Twenty-sixth Day of January, 2016

Michelle K. Lee  
*Director of the United States Patent and Trademark Office*